Aug. 8, 1933.    E. J. STEIN    1,921,489
CUTTING TABLE
Filed Feb. 18, 1931    2 Sheets-Sheet 1
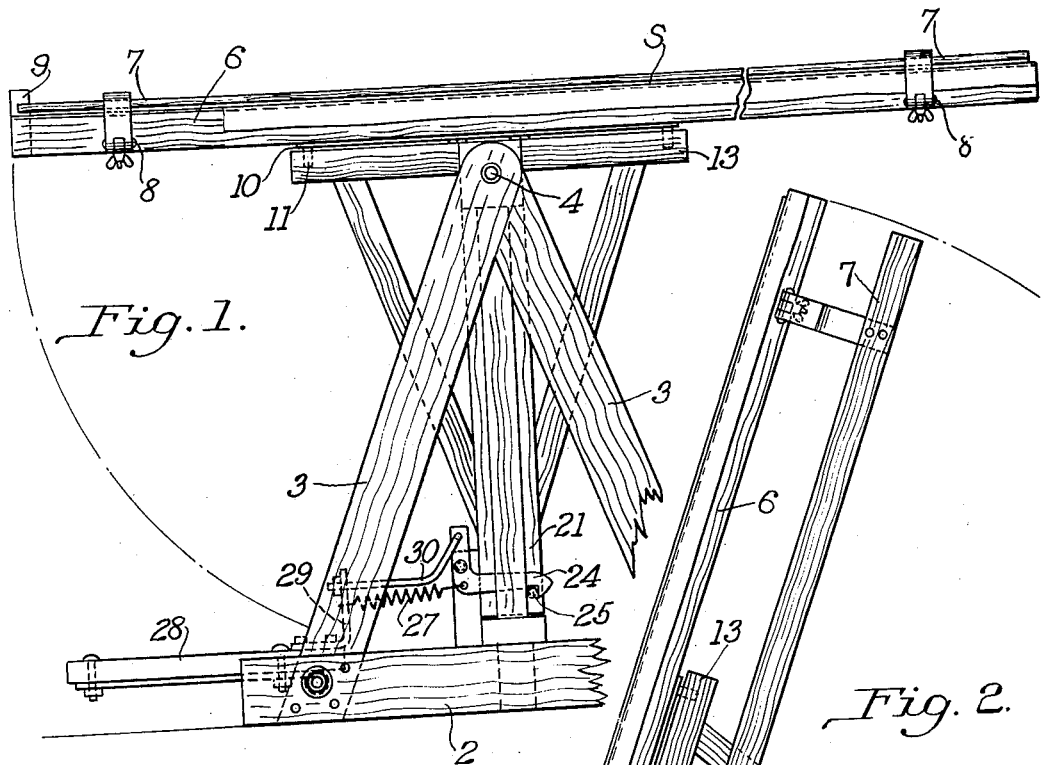
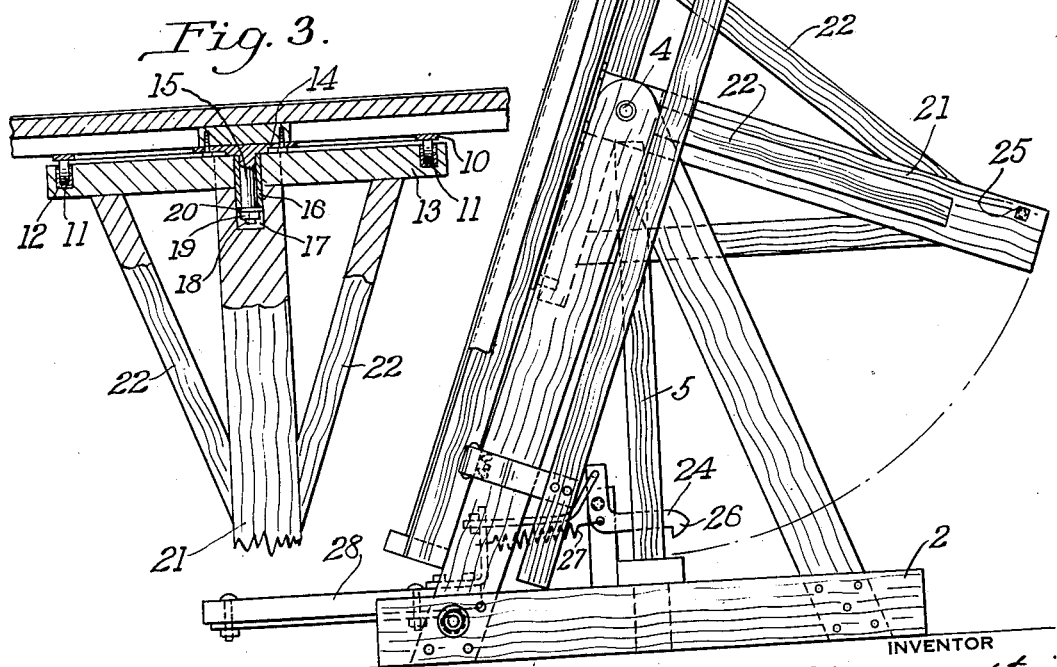

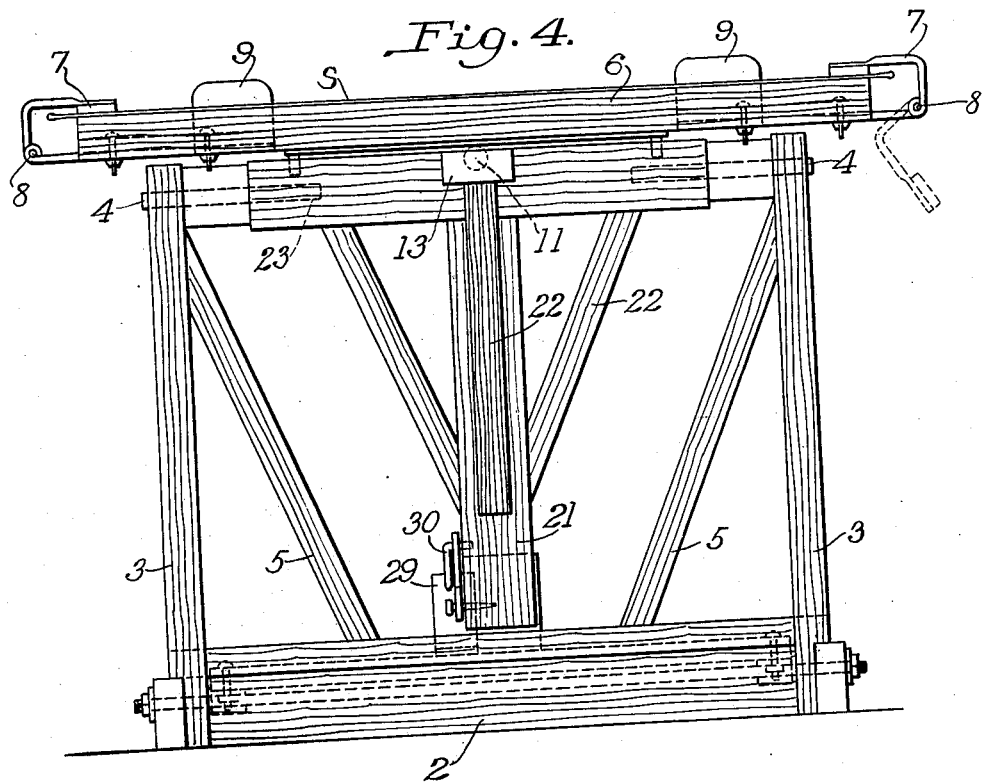

Patented Aug. 8, 1933

1,921,489

UNITED STATES PATENT OFFICE 1,921,489

CUTTING TABLE

Edward J. Stein, Belle Vernon, Pa., assignor to American Window Glass Company, Pittsburgh, Pa., a Corporation of Pennsylvania Application February 18, 1931. Serial No. 516,700

9 Claims. (Cl. 49—48)

My invention relates to cutting tables and, more particularly, to a table adapted to receive and support a sheet of glass during the cutting thereof.

In the cutting of glass sheets, the sheet to be cut is placed on the top of a table which is in substantially horizontal position during the cutting operation. It is inconvenient and difficult to place a large sheet of glass on the cutting table when the table is in the horizontal position. This is particularly true where the sheets of glass to be cut are transported in a vertical position.

By my invention I provide an improved table, the top of which is tiltable to a sheet receiving or discharging position at a substantial angle to the horizontal or cutting position. This facilitates the placing of a sheet of glass thereon and reduces the breakage due to careless handling of the large glass sheets.

By my invention I further provide a table, the top of which, in addition to being tiltable to an angle to the horizontal, is revolvable about an axis substantially perpendicular to the top, while the top is in either the horizontal position or at an angle to the horizontal. This facilitates the cutting of the sheets with a consequent reduction in the cost of handling the same.

I further provide means whereby the top of the table is automatically locked in the horizontal position when placed there, and which may be released by the operator when it is desired to place the table in a glass receiving or discharging position at a substantial angle to the horizontal.

In the accompanying drawings, I have shown for purposes of illustration only, a preferred embodiment of my invention.

In the drawings

Figure 1 is a side elevational view of the table which I provide, shown in horizontal position;

Figure 2 is a side elevational view of the table shown in Figure 1, shown in a glass receiving or discharging position;

Figure 3 is a partial sectional view through the center of the table; and

Figure 4 is an end elevational view of the table which I provide.

The supporting structure of the cutting table which I provide comprises a base 2 having attached thereto on each side of the table two converging upright supporting members 3. Each pair of upright supporting members are joined at the upper ends thereof by means of a pivot pin 4. Supporting struts 5 are provided to give additional support to the table.

The top 6 of the table is adapted to support a sheet of glass S thereon. The top is provided with cutting guides 7 which are pivotally mounted thereon at 8, and are adapted to be placed on the sheet of glass S during the cutting operation and thrown back into the position shown in Figure 2 when it is desired to remove the sheet of glass from the table. The top is further provided with stop pieces 9 which are adapted to prevent the sheet of glass from slipping from the top as it is placed thereon.

The top 6 is supported by the under-structure heretofore described, by means of pivot pins 4. A circular plate 10 is attached to the bottom of the top. This circular plate or track 10 bears on a plurality of rollers 11 which are located in metal pockets 12 in a platform 13. A plate 14 having a downwardly extending stud 15 thereon is attached to the bottom of the top of the table. The plate bears on the top of a sleeve 16 which is located in an opening 17 in the platform. This sleeve acts as a bearing for the top. The stud 15 has a reduced threaded end 18 adapted to receive a nut 19 and a washer 20. The washer bears on the lower end of the sleeve 16 and is held there by the nut 19 on the reduced threaded end of the stud. In this fashion the table top is held in position on the platform and provided with means whereby it may be revolved about an axis vertical thereto.

The platform 13 is reinforced by means of the central reinforcing member 21 and struts 22 which are attached thereto.

The platform 13 is supported by the understructure by means of pivot pins 4 which bear on the upright supports 3 on either side of the base. The platform 13, and consequently the top 6, is revolvable on pivot pins 4 which support the platform 13 through bearings 23 therein. The top may be revolved on the pivot pins 4 to a position at a substantial angle to the horizontal, such as the position shown in Figure 2. In this position, a sheet of glass may be readily placed on or removed from the table.

It is essential to provide means for locking the table in a horizontal position during the cutting operation. Consequently, I provide a lever 24 which is adapted to cooperate with the pin 25 when the table is placed in the horizontal position. When the table is placed in such position, the pin 25 on the member 21 engages the curved head 26 of the lever 24, causes it to rise upwardly and after the pin 25 passes the curved surface of the lever 24, the spring 27 pulls the lever down, thereby locking the table against tilting. When it is desired to tilt the table for the purpose of placing a sheet of glass thereon, or removing one therefrom, the operator steps on the treadle 28 which, through members 29 and 30, raises the lever 24 and releases the top of the table and permits it to swing downwardly to the proper position.

A table of the character just described is extremely important where glass is transported from the drawing machine to the cutting table in a vertical position. If a non-tiltable table were used, it would be necessary to manually remove the sheet to be placed on the table from the carrier, turn it from a vertical position to a horizontal position and lift it onto the table. By the provision of a tiltable table, the glass sheet can be readily placed thereon from a carrier adapted to carry the glass sheet thereto, in a vertical position.

While I have shown and described a preferred embodiment of my invention, it is to be understood that it is not to be limited thereby, but may be otherwise embodied or practiced within the scope of the following claims.

I claim as my invention:

1. A glass cutting table comprising a top adapted to support a glass sheet during cutting thereof, a supporting structure therefor, means whereby the top may be revolved about an axis substantially perpendicular thereto, and means whereby the entire top may be revolved about a substantially horizontal axis.

2. A glass cutting table comprising a platform, a plurality of rollers carried by the platform, a top supported by the rollers and adapted to support a sheet of glass during cutting thereof, means for attaching the top to the platform to permit relative rotation between the top and the platform, and a supporting structure for the platform.

3. A glass cutting table comprising a platform, a plurality of rollers carried by the platform, a top supported by the rollers and adapted to support a sheet of glass, means for attaching the top to the platform to permit relative rotation between the top and the platform, a supporting structure for the platform, and means whereby the top may be moved about a substantially horizontal axis.

4. A glass cutting table comprising a platform, a plurality of rollers carried by the platform, a top supported by the rollers and adapted to support a sheet of glass, said top being normally in a substantially horizontal position, means for attaching the top to the platform to permit relative rotation between the top and the platform, a supporting structure for the platform, and means whereby the top may be moved about a substantially horizontal axis to a position at a substantial angle to the horizontal.

5. A glass cutting table comprising a platform, a plurality of rollers carried by the platform, a top supported by the rollers and adapted to support a sheet of glass, said top being normally in a substantially horizontal position, means for attaching the top to the platform to permit relative rotation between the top and the platform, a supporting structure for the platform, means whereby the top may be moved about a substantially horizontal axis to a position at a substantial angle to the horizontal, and releasable locking means for retaining the top in substantial horizontal position.

6. A glass cutting table comprising a platform, a plurality of rollers carried by the platform, a top supported by the rollers and adapted to support a sheet of glass, said top being normally in a substantially horizontal position, means for attaching the top to the platform to permit relative rotation between the top and the platform, a supporting structure for the platform, means whereby the top may be moved about a substantially horizontal axis to a position at a substantial angle to the horizontal, and releasable locking means including a treadle for retaining the top in substantial horizontal position.

7. A glass cutting table comprising a top adapted to support a glass sheet during cutting thereof, a supporting structure therefor, a cutting guide carried by said top, and means whereby the top may be revolved about an axis substantially perpendicular thereto.

8. A glass cutting table comprising a top adapted to support a glass sheet during cutting thereof, a supporting structure therefor, a cutting guide carried by said top, means whereby the top may be revolved about an axis substantially perpendicular thereto, and means whereby the top may be revolved about a substantially horizontal axis.

9. A glass cutting table comprising a top adapted to support a glass sheet during cutting thereof, a supporting structure therefor, releasable locking means including a treadle for locking the top in a substantially horizontal position, means whereby the top may be revolved about a substantially horizontal axis, and means whereby the entire top may be revolved about an axis substantially perpendicular thereto.

EDWARD J. STEIN.